US012604141B2

(12) United States Patent
Huang et al.

(10) Patent No.: US 12,604,141 B2
(45) Date of Patent: Apr. 14, 2026

(54) ULTRA-LOW FREQUENCY SOUND COMPENSATION METHOD AND SYSTEM BASED ON HAPTIC FEEDBACK, AND COMPUTER-READABLE STORAGE MEDIUM

(71) Applicant: AAC Technologies (Nanjing) Co., Ltd., Nanjing (CN)

(72) Inventors: Xingzhi Huang, Nanjing (CN); Wei Song, Nanjing (CN); Yun Tang, Nanjing (CN); Lubin Mao, Nanjing (CN); Ronglin Linghu, Nanjing (CN); Jie Ma, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 303 days.

(21) Appl. No.: 18/330,327

(22) Filed: Jun. 6, 2023

(65) Prior Publication Data

US 2024/0223950 A1 Jul. 4, 2024

Related U.S. Application Data

(63) Continuation of application No. PCT/CN2023/081643, filed on Mar. 15, 2023.

(30) Foreign Application Priority Data

Dec. 30, 2022 (CN) .......................... 202211729289.1

(51) Int. Cl.
*H04R 3/14* (2006.01)
*B06B 1/02* (2006.01)
*G06F 3/01* (2006.01)

(52) U.S. Cl.
CPC ............. *H04R 3/14* (2013.01); *B06B 1/0276* (2013.01); *G06F 3/016* (2013.01); *H04R 2400/03* (2013.01); *H04R 2499/11* (2013.01)

(58) Field of Classification Search
CPC .. H04R 3/14; H04R 2400/03; H04R 2499/11; B06B 1/0276; G06F 3/016
See application file for complete search history.

(56) References Cited

U.S. PATENT DOCUMENTS

2017/0249954 A1* 8/2017 Kim ........................ G10L 25/84

FOREIGN PATENT DOCUMENTS

CN 208638570 U * 3/2019

* cited by examiner

*Primary Examiner* — Annabelle Kang
(74) *Attorney, Agent, or Firm* — Wiersch Law Group

(57) ABSTRACT

This application provides an ultra-low frequency sound compensation system and method based on haptic feedback, and a computer-readable storage medium. The ultra-low frequency sound compensation system includes a response module, configured to sense an ultra-low frequency sound compensation operation of a user, and output a control command while sensing the ultra-low frequency sound compensation operation; a processing module, configured to process an audio signal to be output under control of the control command to obtain an ultra-low frequency signal; and a vibration module, configured to be driven to by the ultra-low frequency signal to generate a vibration.

5 Claims, 8 Drawing Sheets

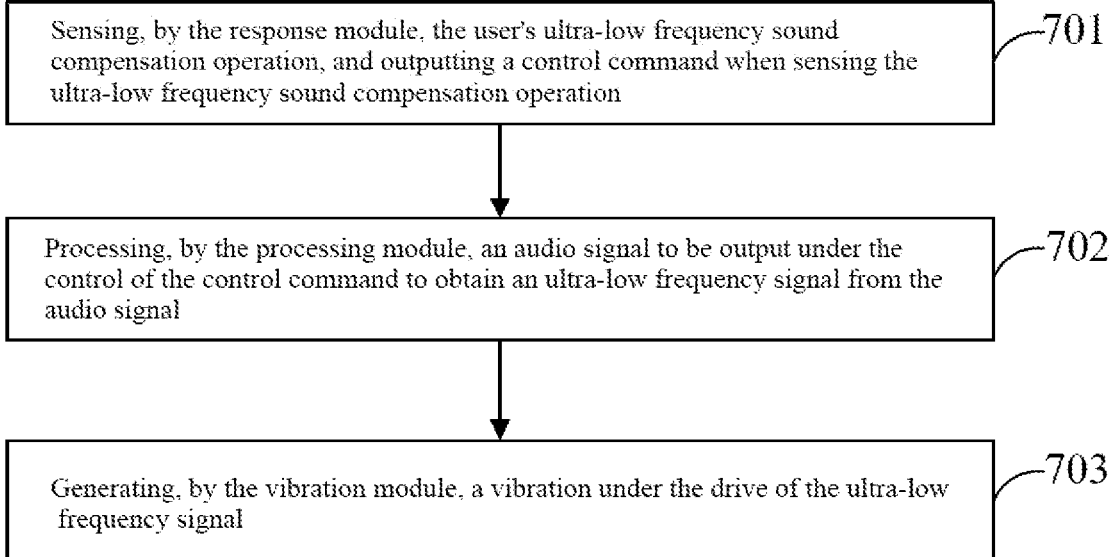

Sensing, by the response module, the user's ultra-low frequency sound compensation operation, and outputting a control command when sensing the ultra-low frequency sound compensation operation ——701

Processing, by the processing module, an audio signal to be output under the control of the control command to obtain an ultra-low frequency signal from the audio signal ——702

Generating, by the vibration module, a vibration under the drive of the ultra-low frequency signal ——703

FIG.7

ULTRA-LOW FREQUENCY SOUND COMPENSATION METHOD AND SYSTEM BASED ON HAPTIC FEEDBACK, AND COMPUTER-READABLE STORAGE MEDIUM

TECHNICAL FIELD

The present application relates to haptic feedback technology, and more particularly to an ultra-low frequency sound compensation method and system based on haptic feedback, and a computer-readable storage medium.

BACKGROUND

Speakers (SPK) of the existing mobile phones generally have a resonant frequency of about 500 Hz, which makes the audio signals in the ultra-low frequency band (below 100 Hz) fail to be completely output through the SPK, such that the users cannot receive such ultra-low frequency band when listening to music or watching video via the phone, greatly affecting the audio-visual experience.

In view of this, it is urgently needed to optimize the output scheme of the audio signals in the ultra-low frequency band.

SUMMARY

An object of the present application is to provide an ultra-low frequency sound compensation method and system based on haptic feedback, and a computer-readable storage medium to overcome the defect in the prior art that the audio signals in the ultra-low frequency band fails to be output through the speaker (SPK), and thus the users' audio-visual experience is weakened.

Technical solutions of this application will be specifically described below.

In a first aspect, this application provides an ultra-low frequency sound compensation system based on haptic feedback, comprising:

a response module;

a processing module; and a vibration module;

wherein the response module is configured to sense an ultra-low frequency sound compensation operation of a user, and output a control command when sensing the ultra-low frequency sound compensation operation;

the processing module is configured to process an audio signal to be output under control of the control command to obtain an ultra-low frequency signal from the audio signal to be output; and the vibration module is configured to be driven by the ultra-low frequency signal to generate a vibration.

In a second aspect, this application provides a haptic feedback-based ultra-low frequency sound compensation method applied to the system provided in the first aspect of this application, comprising:

sensing, by the response module, an ultra-low frequency sound compensation operation of a user; and outputting, by the response module, a control command when sensing the ultra-low frequency sound compensation operation;

processing, by the processing module, an audio signal to be output under control of the control command to obtain an ultra-low frequency signal from the audio signal to be output; and generating, by the vibration module, a vibration under drive of the ultra-low frequency signal.

In a third aspect, this application provides a computer-readable storage medium, wherein a computer program is stored on the computer-readable storage medium; and the computer program is configured to be called by a control processor to implement the haptic feedback-based ultra-low frequency sound compensation method provided in the second aspect of the present application.

Compared to the prior art, this application has the following beneficial effects.

The haptic feedback-based ultra-low frequency sound compensation system provided herein integrates a response module, a processing module, and a vibration module. In the practical application, the response module can sense the ultra-low frequency sound compensation operation of a user, and output a control command while sensing the ultra-low frequency sound compensation operation; the processing module can process an audio signal to be output under the control of the control command to obtain the ultra-low frequency signal from the audio signal; and finally, the vibration module can be driven by the ultra-low frequency signal to generate the corresponding vibration. When the generated vibration is transmitted to the user's brain through the user's body (e.g., palm, cheek, etc.), a virtual ultra-low frequency enhancement effect will be produced, which can remedy the deficiency in the prior art that the ultra-low frequency band (below 100 Hz) is absent when users listen to music or watch videos through the phone, greatly enhancing the users' audiovisual experience.

BRIEF DESCRIPTION OF THE DRAWINGS

In order to illustrate the technical solutions in the prior art or in the embodiments of the present application more clearly, the drawings needed in the description of the prior art or embodiments of the present application will be briefly described below. Obviously, presented in the drawings are merely some embodiments of this application, which are not intended to limit this application. For those skilled in the art, other drawings can be obtained based on the drawings provided herein without making creative effort.

FIG. 7 is a flow chart of an ultra-low frequency sound compensation method according to an embodiment of this application.

DETAILED DESCRIPTION OF THE EMBODIMENTS

The present application will be described clearly and completely below with reference to the accompanying drawings and embodiments to make objects, technical solutions, and advantages of the present application clearer and better understood. The same or similar reference signs indicate the same or similar components or components having the same or similar functions throughout the drawings. It should be understood that the embodiments described below are merely illustrative of the present application, and are not intended to limit the present application. Other embodiments obtained by those skilled in the art based on the content disclosed herein without making creative effort should fall within the scope of the present application. Moreover, the technical features involved in the following embodiments can be combined in the premise of no contradiction.

Figure 1:
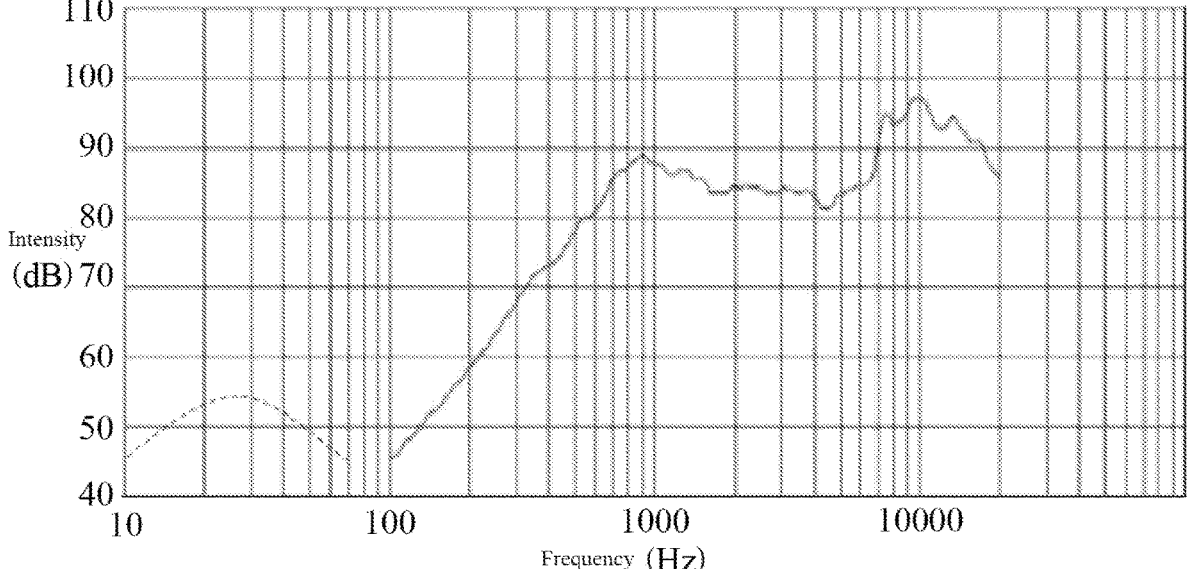
FIG. 1 schematically illustrates a frequency response curve of a speaker (SPK) in a mobile phone.

FIG. 1 shows a frequency response curve of a speaker (SPK) in a mobile phone. The resonant frequency of the SPK in the phone is usually around 500 Hz (shown as the solid line in FIG. 1), which causes that the audio signal in the ultra-low frequency band (below 100 Hz, shown as the dotted line in FIG. 1) cannot be output through the SPK, such that the ultra-low frequency band (below 100 Hz) is absent when users listen to music or watch videos through the phone, greatly affecting the users' audio and visual experience. In this regard, an embodiment of this application provides an ultra-low frequency sound compensation system based on haptic feedback, which can effectively remedy the deficiency in the prior art that the ultra-low frequency band (below 100 Hz) is absent when users listen to music or watch videos through the phone. Detailed description will be made below to the ultra-low frequency sound compensation system.

Figure 2:
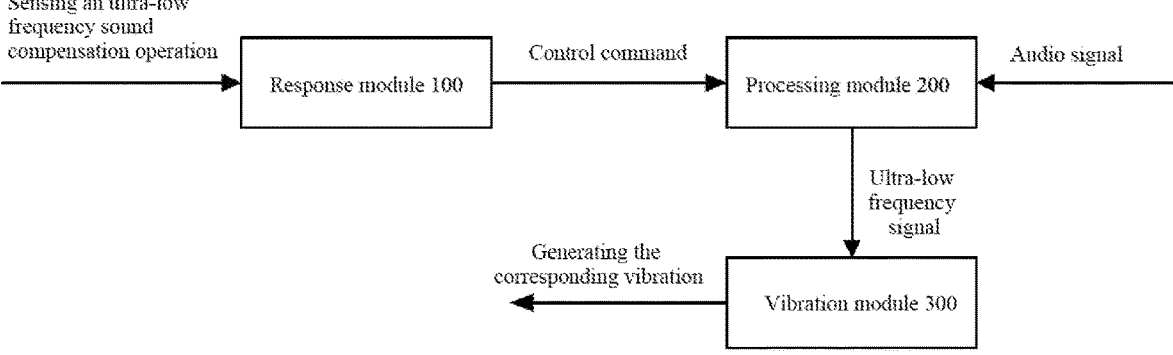
FIG. 2 is a schematic diagram of an ultra-low frequency sound compensation system according to an embodiment of this application.

FIG. 2 is a schematic diagram of an ultra-low frequency sound compensation system provided in this embodiment. The ultra-low frequency sound compensation system includes a response module 100, a processing module 200 and a vibration module 300, where the response module 100 is configured to sense an ultra-low frequency sound compensation operation of a user, and output a control command while sensing the ultra-low frequency sound compensation operation; the processing module 200 is configured to process an audio signal to be output under the control of the control command to obtain an ultra-low frequency signal from the audio signal; and the vibration module 300 is configured to be driven by the ultra-low frequency signal to generate the corresponding vibration.

It is understandable that in this embodiment, the response module 100, processing module 200 and vibration module 300 together constitute the haptic feedback-based ultra-low frequency sound compensation system. In the practical application, the response module 100 can sense the ultra-low frequency sound compensation operation of a user, and output a control command while sensing the ultra-low frequency sound compensation operation; the processing module 200 can process an audio signal to be output under the control of the control command to obtain the ultra-low frequency signal from the audio signal; and finally, the vibration module 300 will be driven by the ultra-low frequency signal to generate the corresponding vibration. When the generated vibration is transmitted to the user's brain through the user's body (e.g., palm, cheek, etc.), a virtual ultra-low frequency enhancement effect will be produced, which can remedy the deficiency in the prior art that the ultra-low frequency band (below 100 Hz) is absent when users listen to music or watch videos through the phone, greatly enhancing the users' audiovisual experience.

Several block diagrams of the ultra-low frequency sound compensation system are respectively displayed in FIGS. 3-6. The response module 100 includes a phone content interface 110, and a control command unit 120, where the phone content interface 110 can be understood as the interface displayed on the mobile-phone screen, including but not limited to, interfaces of various video APPs and music APPs. An ultra-low frequency sound compensation button 111 may be set on the phone content interface 110 through the floating manner. When the ultra-low frequency enhancement effect is required or no longer required, the users can touch the ultra-low frequency sound compensation button 111 to start or stop the ultra-low frequency sound compensation function, and slide the ultra-low frequency sound compensation button 111 to adjust the ultra-low frequency sound compensation intensity. The touching operation performed by users for the ultra-low frequency sound compensation button 111 is the ultra-low frequency sound compensation operation. After the user touches the ultra-low frequency sound compensation button 111 (namely, sensing the user's ultra-low frequency sound compensation operation), the control command unit 120 will generate a corresponding control command and transmit the control command to the processing module 200. Further, after receiving the control command from the control command unit 120, the processing module 200 will obtain the ultra-low frequency signal from the audio signal in a preset manner under the control of the control command, and transmit the ultra-low frequency signal to the vibration module 300 to drive the vibration module 300 to generate the corresponding vibration and transmit the vibration to the use's brain through the user's body.

Figure 3:
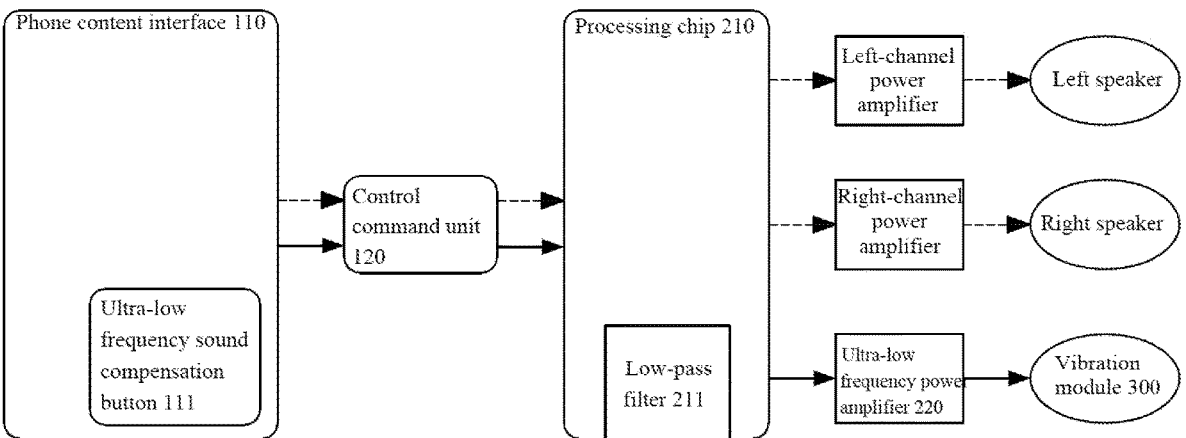
FIG. 3 is a first block diagram of the ultra-low frequency sound compensation system according to an embodiment of this application.

Referring to an embodiment of the ultra-low frequency sound compensation system shown in FIG. 3, the processing module 200 includes a processing chip 210 and a power amplifier (i.e., the ultra-low frequency power amplifier 220 in FIG. 3), where the processing chip 210 is pre-equipped with a low-pass filter 211 to perform low-pass filtering on the audio signal to be output under the control of the control command, so as to obtain the ultra-low frequency signal from the audio signal. The ultra-low frequency power amplifier 220 is configured to amplify and transmit the ultra-low frequency signal to the vibration module 300. In this embodiment, a cut-off frequency of the low-pass filter 211 is 100 Hz.

Figure 4:
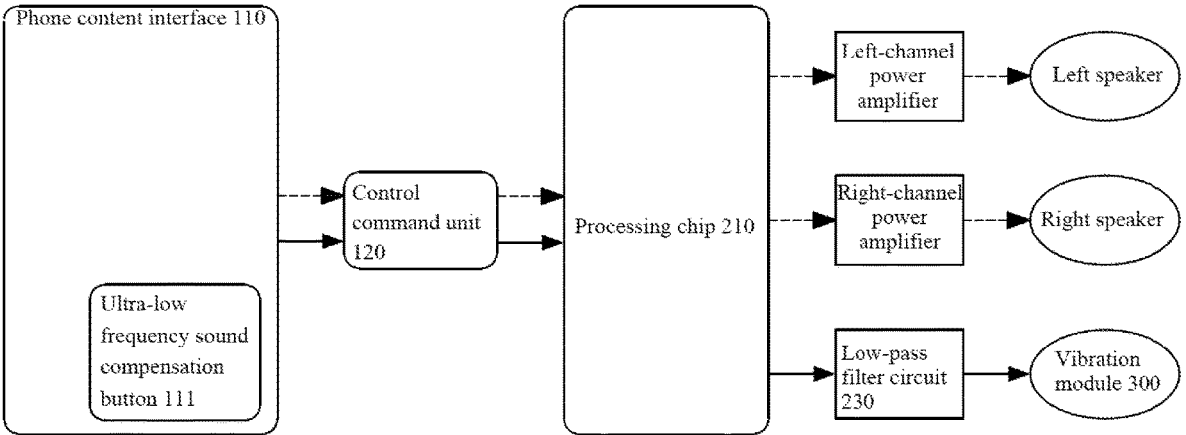
FIG. 4 is a second block diagram of the ultra-low frequency sound compensation system according to an embodiment of this application.

Referring to an embodiment of the ultra-low frequency sound compensation system shown in FIG. 4, the processing module 200 includes a processing chip 210 and a low-pass filter circuit 230, where the processing chip 210 is configured to obtain the audio signal to be output under the control of the control command; and the low-pass filter circuit 230 is configured to perform low-pass filtering on the audio signal to obtain and transmit the ultra-low frequency signal to the vibration module 300. In this embodiment, a cut-off frequency of the low-pass filter circuit 230 is 100 Hz. It can be understood that although this implementation and the previous implementation both obtain the ultra-low frequency signal through the low-pass filtering of the audio signal, the low-pass filtering in this implementation is performed by means of a hardware circuit, that is, the low-pass filter circuit 230 is separately arranged outside the processing chip 210, which is different from the integration of the low-pass filter 211 on the processing chip 210 in the previous implementation. In other implementations, the low-pass filter circuit 230 can be integrated into the vibration module 300.

Figure 5:
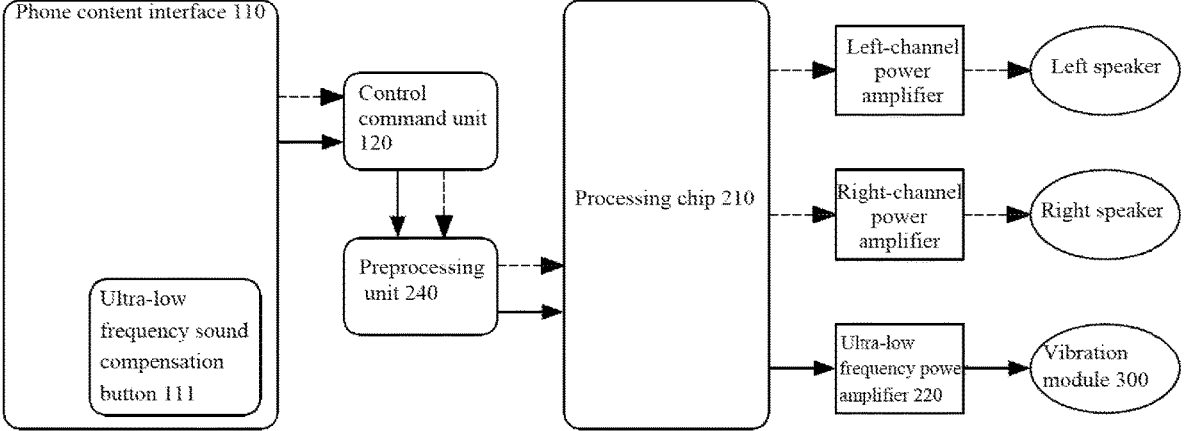
FIG. 5 is a third block diagram of the ultra-low frequency sound compensation system according to an embodiment of this application.

Referring to an embodiment of the ultra-low frequency sound compensation system shown in FIG. 5, the processing module 200 includes a preprocessing unit 240, a processing chip 210 and a power amplifier (i.e., the ultra-low frequency power amplifier 220 in FIG. 5), where the preprocessing unit 240 is configured to identify and extract a target signal of a preset type (such as percussion and other special beat signals) from the audio signal to be output under the control of the control command as the ultra-low frequency signal; the processing chip 210 is configured to obtain the ultra-low frequency signal from the preprocessing unit 240; and the ultra-low frequency power amplifier 220 is configured to amplify and transmit the ultra-low frequency signal to the vibration module 300. It can be observed that this implementation is different from the previous two implementations in that in this implementation, the ultra-low frequency signal is obtained by identifying and extracting the target signal of the preset type from the audio signal, rather than the low-pass filtering of the audio signal. This implementation can arrive at an improved ultra-low frequency enhancement effect.

Figure 6:
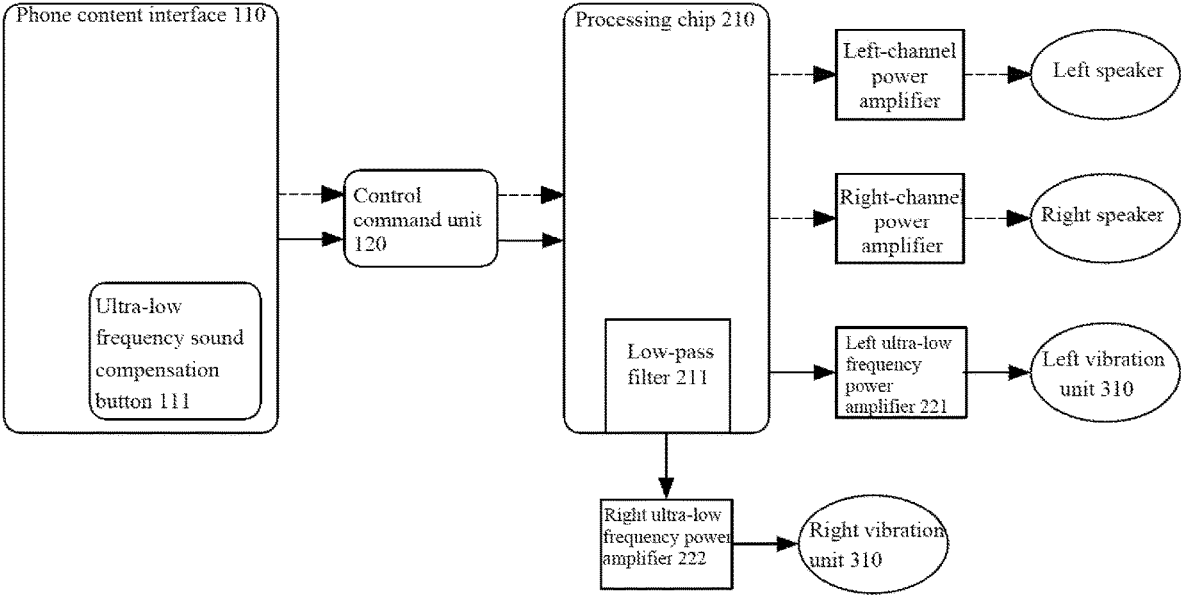
FIG. 6 is a fourth block diagram of the ultra-low frequency sound compensation system according to an embodiment of this application.

Referring to an embodiment of the ultra-low frequency sound compensation system shown in FIG. 6, the ultra-low frequency signal can be a monophonic (mono) signal or a stereo signal (i.e., two-channel signal). When the ultra-low frequency signal is a stereo signal, it includes a left ultra-low frequency sub-signal and a right ultra-low frequency sub-signal. In this case, the ultra-low frequency power amplifier 220 includes a left ultra-low frequency power amplifier 221 for amplifying the left ultra-low frequency sub-signal and a right ultra-low frequency power amplifier 222 for amplifying the right ultra-low frequency sub-signal, and the vibration module 300 includes a left vibration unit 310 and a right vibration unit 320, where the left vibration unit 310 is configured to be driven by the left ultra-low frequency sub-signal to generate the corresponding vibration, and the right vibration unit 320 is configured to be driven by the right ultra-low frequency sub-signal to generate the corresponding vibration.

It should be noted that described above are merely preferred embodiments of the present application, and are not intended to limit the present application. Therefore, those skilled in the art can make flexible adjustment based on the embodiments provided herein according to the actual application scenario. Moreover, referring to the block diagrams of the ultra-low frequency sound compensation system in FIGS. 3-6, in addition to the conventional stereo playback function, the embodiment of the present application also has an ultra-low frequency enhancement and playback function. In FIGS. 3-6, the solid line arrow represents the ultra-low frequency enhancement channel, and the dashed arrow indicates the conventional stereo channel (not described in detail herein).

The embodiment of this application also provides a haptic feedback-based ultra-low frequency sound compensation method (as shown in FIG. 7) applied to the above-mentioned ultra-low frequency sound compensation system, which includes the following steps (701)-(703).

Step (701) The response module 100 senses the user's ultra-low frequency sound compensation operation, and outputs a control command while sensing the ultra-low frequency sound compensation operation.

In this embodiment, the user can perform a preset ultra-low frequency sound compensation operation to arrive at the ultra-low frequency enhancement effect, and the response module 100 will sense the user's ultra-low frequency sound compensation operation, and output the control command at the same time.

Step (702) The processing module 200 processes the audio signal to be output under the control of the control command to obtain the ultra-low frequency signal from the audio signal.

In this embodiment, after the response module 100 outputs the control command, the processing module 200 will process the audio signal to be output under the control of the control command to obtain the ultra-low frequency signal from the audio signal, and transmit the obtained ultra-low frequency signal to the vibration module 300.

Step (703) The vibration module 300 generates the corresponding vibration under the drive of the ultra-low frequency signal.

In this embodiment, after the processing module 200 obtains and transmits the ultra-low frequency signal to the vibration module 300, the vibration module 300 will generate the corresponding vibration under the drive of the ultra-low frequency signal. After the vibration is transmitted to the user's brain through the user's body, a virtual ultra-low frequency enhancement effect will be produced, so as to remedy the deficiency in the prior art that the ultra-low frequency band (below 100 Hz) is absent when the users listen to music or watch videos through the phone, greatly enhancing the user's audio-visual experience. Regarding the part of the ultra-low frequency sound compensation method that is not described in detail herein, reference can be made to the corresponding description of the aforementioned ultra-low frequency sound compensation system.

Figure 8:
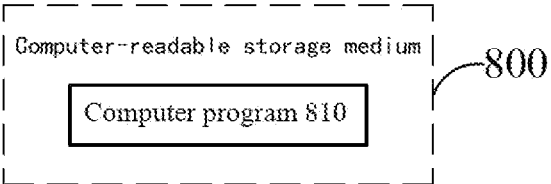
FIG. 8 is a block diagram of a computer-readable storage medium according to an embodiment of this application.

An embodiment of this application also provides a computer-readable storage medium 800 (as shown in FIG. 8), which stores a computer program 810. The computer program 801 is configured to be called by a control processor to implement the aforementioned ultra-low frequency sound compensation method.

The steps of the method or algorithm described in conjunction with the embodiments disclosed herein may be implemented directly with hardware, a software module executed by a processor, or a combination thereof. The software module can be stored in random access memory (RAM), memory, read-only memory (ROM), electrically programmable ROM, electrically erasable programmable ROM, register, hard disk, removable disk, CD-ROM, or any other storage mediums known in the art.

The above embodiments may be implemented completely or partially by software, hardware, firmware, or any combination thereof. When implemented using software, it may be implemented in whole or in part in the form of a computer program product. The computer program product includes one or more computer instructions. The computer program instruction is loaded and executed on a computer to, in whole or in part, implement the process or function described herein. The computer may be a general-purpose computer, a special-purpose computer, a computer network, or other programmable devices. The computer instruction may be stored in a computer-readable storage medium, or transmitted from one computer-readable storage medium to another computer-readable storage medium, for example, the computer instruction may be transmitted from one web site, computer, server, or data center to another web site, computer, server, or data center in a wired (e.g., coaxial cable, fiber optic and digital subscriber line) or wireless (e.g., infrared, wireless, microwave, etc.) manner. The computer-readable storage medium may be any available medium that a computer can access or a data storage device (such as a server, data center, etc.) integrating one or more available mediums. The available medium may be magnetic medium (e.g., floppy disk, hard disk, tape), optical media (e.g., DVD), or semiconductor media (e.g., solid state disk).

It should be noted that individual embodiments of the present application are described in a progressive manner, with each focusing on what is different from other embodiments. Reference can be made between the embodiments for the same or similar parts. The product embodiment is described in a relatively simple manner since it is similar to the method embodiment, and reference can be made to the method embodiment for the relevant description.

It should also be noted that as used herein, terms "first" and "second" are used only to distinguish one entity or operation from another, and do not necessarily require or imply any such actual relationship or order between those entities or operations. Further, the terms "include", "comprise", or any other variations thereof are intended to cover non-exclusive inclusion, such that a process, method, article, or apparatus including a series of elements includes not only those listed elements, but also other elements not expressly listed, or elements inherent to such process, method, article, or apparatus. Unless otherwise specified, the elements defined by the statement "including a . . . " do not preclude the existence of additional identical elements in the process, method, article, or apparatus including said elements.

The foregoing description of the disclosed embodiments enables those of ordinary skill in the art to implement or use the technical solutions of this application, and is not intended to limit the present application. It should be understood that any variations, replacements and modifications made by those of ordinary skill in the art without departing from the spirit and scope of the present application shall fall within the scope of the present application defined by the appended claims.

What is claimed is:

1. An ultra-low frequency sound compensation system based on haptic feedback, comprising:
   a response module;
   a processing module; and
   a vibrator;
   wherein the response module is configured to sense an ultra-low frequency sound compensation operation of a user, and output a control command when sensing the ultra-low frequency sound compensation operation; the response module includes a phone content interface and a control command unit; an ultra-low frequency sound compensation button is set on the phone content interface through a floating manner; the ultra-low frequency sound compensation operation is that users can touch the ultra-low frequency sound compensation button to start or stop the ultra-low frequency sound compensation function, and slide the ultra-low frequency sound compensation button to adjust the ultra-low frequency sound compensation intensity; After the user touches the ultra-low frequency sound compensation button, the control command unit will generate a corresponding control command and transmit the control command to the processing module;
   the processing module is configured to process an audio signal to be output under control of the control command to obtain an ultra-low frequency signal from the audio signal to be output; the processing module comprises a preprocessing unit, a processing chip and a power amplifier; the preprocessing unit is configured to identify and extract, under the control of the control command, a target signal of a preset type from the audio signal to be output as the ultra-low frequency signal;

the processing chip is configured to obtain the ultra-low frequency signal; and the power amplifier is configured to amplify and transmit the ultra-low frequency signal from the processing chip to the vibrator; and
   the vibrator is configured to be driven by the ultra-low frequency signal to generate a vibration.

2. The ultra-low frequency sound compensation system of claim 1, wherein the ultra-low frequency signal is a mono signal or a stereo signal; and
   when the ultra-low frequency signal is a stereo signal comprising a first ultra-low frequency sub-signal and a second ultra-low frequency sub-signal, the vibrator comprises a first vibrator and a second vibrator; wherein the first vibration-unit vibrator is configured to be driven by the first ultra-low frequency sub-signal to generate a first vibration, and the second vibrator is configured to be driven by the second ultra-low frequency sub-signal to generate a second vibration.

3. A haptic feedback-based ultra-low frequency sound compensation method applied to an ultra-low frequency sound compensation system, the ultra-low frequency sound compensation system comprising a response module, a processing module and a vibrator, and the haptic feedback-based ultra-low frequency sound compensation method comprising:
   sensing, by the response module, an ultra-low frequency sound compensation operation of a user; and outputting, by the response module, a control command when sensing the ultra-low frequency sound compensation operation; the response module includes a phone content interface and a control command unit: an ultra-low frequency sound compensation button is set on the phone content interface through a floating manner; the ultra-low frequency sound compensation operation is that users can touch the ultra-low frequency sound compensation button to start or stop the ultra-low frequency sound compensation function, and slide the ultra-low frequency sound compensation button to adjust the ultra-low frequency sound compensation intensity; After the user touches the ultra-low frequency sound compensation button, the control command unit will generate a corresponding control command and transmit the control command to the processing module;
   processing, by the processing module, an audio signal to be output under control of the control command to obtain an ultra-low frequency signal from the audio signal to be output; the processing module comprises a preprocessing unit, a processing chip and a power amplifier; and
   the step of "processing, by the processing module, an audio signal to be output under control of the control command to obtain an ultra-low frequency signal from the audio signal to be output" comprises:
   identifying and extracting, by the preprocessing unit, a target signal of a preset type from the audio signal to be output under the control of the control command as the ultra-low frequency signal;
   obtaining by the processing chip, the ultra-low frequency signal from the preprocessing unit; and
   amplifying and transmitting, by the power amplifier, the ultra-low frequency signal from the processing chip to the vibrator; and
   generating, by the vibrator, a vibration under drive of the ultra-low frequency signal.

4. The haptic feedback-based ultra-low frequency sound compensation method of claim 3, wherein the ultra-low frequency is a mono signal or a stereo signal; and when the ultra-low frequency signal is a stereo signal comprising a first ultra-low frequency sub-signal and a second ultra-low frequency sub-signal, the vibrator comprises a first vibrator and a second vibrator, and the step of "generating, by the vibrator, a vibration under drive of the ultra-low frequency signal" comprises:

generating, by the first vibrator, a first vibration under drive of the first ultra-low frequency sub-signal; and generating, by the second vibrator, a second vibration under drive of the second ultra-low frequency sub-signal.

5. A non-transitory computer-readable storage medium, wherein a computer program is stored on the non-transitory computer-readable storage medium; and the computer program is configured to be called by a control processor to implement the haptic feedback-based ultra-low frequency sound compensation method of claim 3.

\* \* \* \* \*